(12) United States Patent
Dickinson

(10) Patent No.: US 8,050,386 B2
(45) Date of Patent: Nov. 1, 2011

(54) MOBILE AUTOMATIC LOCATION IDENTIFICATION (ALI) FOR FIRST RESPONDERS

(75) Inventor: Richard Dickinson, Seattle, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 1298 days.

(21) Appl. No.: 11/705,101

(22) Filed: Feb. 12, 2007

(65) Prior Publication Data

US 2008/0192731 A1    Aug. 14, 2008

(51) Int. Cl.
*H04M 11/04* (2006.01)
(52) U.S. Cl. ........................................................ 379/45
(58) Field of Classification Search ...................... 379/45
See application file for complete search history.

(56) References Cited

U.S. PATENT DOCUMENTS

| | | | |
|---|---|---|---|
| 4,625,081 A | 11/1986 | Lotito | |
| 6,321,091 B1 | 11/2001 | Holland | |
| 6,456,852 B2 | 9/2002 | Bar | |
| 6,529,500 B1 | 3/2003 | Pandharipande | |
| 6,529,722 B1 | 3/2003 | Heinrich | |
| 6,584,307 B1 | 6/2003 | Antonucci | |
| 6,650,901 B1 | 11/2003 | Schuster | |
| 6,678,357 B2 | 1/2004 | Stumer | |
| 6,744,856 B2 | 6/2004 | Karnik | |
| 6,744,858 B1 | 6/2004 | Ryan | |
| 6,771,742 B2 | 8/2004 | McCalmont | |
| 6,775,534 B2 | 8/2004 | Lindgren | |
| 6,779,049 B2 | 8/2004 | Altman | |
| 6,813,264 B2 | 11/2004 | Vassilovski | |
| 6,940,950 B2 | 9/2005 | Dickinson et al. | |
| 6,963,557 B2 | 11/2005 | Knox | |
| 6,968,044 B2 | 11/2005 | Beason | |
| 7,106,717 B2 | 9/2006 | Rousseau | |
| 7,136,466 B1 | 11/2006 | Gao | |
| 7,171,220 B2 | 1/2007 | Belcea | |
| 7,177,397 B2 | 2/2007 | McCalmont | |
| 7,177,399 B2 | 2/2007 | Dawson | |
| 7,194,249 B2 | 3/2007 | Phillips | |
| 7,245,900 B1 | 7/2007 | Lamb | |

(Continued)

FOREIGN PATENT DOCUMENTS

WO    WO9921380    4/1999

(Continued)

OTHER PUBLICATIONS

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

(Continued)

*Primary Examiner* — Alexander Jamal
(74) *Attorney, Agent, or Firm* — William H. Bollman

(57) ABSTRACT

Automatic Location Indication (ALI) data is digitally transferred from a Public Safety Answering Point (PSAP) to a first responder via a web site accessed by the first responder. The web site lists each live E911 call within their jurisdiction, and appends the caller's ALI and/or other location data relative to each call. Preferably the first responders (e.g., police car, paramedic, ambulance, fire truck, etc.) can view not only the emergency caller's information for those E911 calls that they are responding to, but also information about other emergency callers that other first responders are responding to. This facilitates the actual response to individual emergency calls as well as the overall management of multiple responders to multiple emergency calls.

12 Claims, 4 Drawing Sheets

U.S. PATENT DOCUMENTS

| | | | |
|---|---|---|---|
| 7,260,186 B2 | 8/2007 | Zhu | |
| 7,260,384 B2 | 8/2007 | Bales et al. | |
| 7,330,899 B2 | 2/2008 | Wong | |
| 7,333,480 B1 | 2/2008 | Clarke | |
| 7,366,157 B1 | 4/2008 | Valentine | |
| 7,369,530 B2 | 5/2008 | Keagy | |
| 7,412,049 B1 | 8/2008 | Koch | |
| 7,436,785 B1 | 10/2008 | McMullen | |
| 7,440,442 B2 | 10/2008 | Grabelsky | |
| 7,573,982 B2 * | 8/2009 | Breen et al. | 379/45 |
| 7,617,287 B2 | 11/2009 | Vella | |
| 7,702,081 B1 | 4/2010 | Klesper | |
| 2001/0040886 A1 | 11/2001 | Jimenez | |
| 2002/0118796 A1 * | 8/2002 | Menard et al. | 379/45 |
| 2002/0126656 A1 | 9/2002 | Park | |
| 2003/0026245 A1 | 2/2003 | Ejzak | |
| 2003/0069002 A1 | 4/2003 | Hunter | |
| 2003/0086539 A1 | 5/2003 | McCalmont | |
| 2003/0096623 A1 | 5/2003 | Kim | |
| 2003/0109245 A1 | 6/2003 | McCalmont | |
| 2004/0043775 A1 | 3/2004 | Kennedy | |
| 2004/0132465 A1 | 7/2004 | Mattila | |
| 2004/0150518 A1 | 8/2004 | Philips | |
| 2004/0176123 A1 | 9/2004 | Chin | |
| 2004/0180671 A1 | 9/2004 | Spain | |
| 2004/0182493 A1 | 9/2004 | Chick | |
| 2004/0184584 A1 | 9/2004 | McCalmont | |
| 2004/0190497 A1 | 9/2004 | Knox | |
| 2004/0203568 A1 | 10/2004 | Kirtland | |
| 2004/0203575 A1 | 10/2004 | Chin | |
| 2004/0247090 A1 | 12/2004 | Nurmela | |
| 2005/0003797 A1 | 1/2005 | Baldwin | |
| 2005/0030977 A1 | 2/2005 | Casey | |
| 2005/0048987 A1 | 3/2005 | Glass | |
| 2005/0083911 A1 | 4/2005 | Grabelsky | |
| 2005/0085257 A1 * | 4/2005 | Laird et al. | 455/550.1 |
| 2005/0107673 A1 | 5/2005 | Ball | |
| 2005/0169248 A1 | 8/2005 | Truesdale | |
| 2005/0190892 A1 | 9/2005 | Dawson | |
| 2005/0201528 A1 | 9/2005 | Meer | |
| 2005/0201529 A1 | 9/2005 | Nelson | |
| 2005/0261002 A1 | 11/2005 | Cheng | |
| 2006/0058049 A1 | 3/2006 | McLaughlin | |
| 2006/0068753 A1 | 3/2006 | Karpen | |
| 2006/0069503 A1 | 3/2006 | Suomela et al. | |
| 2006/0125692 A1 | 6/2006 | Wang | |
| 2006/0135132 A1 | 6/2006 | Cai | |
| 2006/0188083 A1 | 8/2006 | Breen | |
| 2006/0193447 A1 | 8/2006 | Schwartz | |
| 2007/0003024 A1 | 1/2007 | Olivier | |
| 2007/0019614 A1 | 1/2007 | Hoffman | |
| 2007/0021908 A1 | 1/2007 | Jaugilas | |
| 2007/0022011 A1 | 1/2007 | Altberg | |
| 2007/0036139 A1 | 2/2007 | Patel | |
| 2007/0041513 A1 | 2/2007 | Gende | |
| 2007/0115941 A1 | 5/2007 | Patel | |
| 2007/0121601 A1 | 5/2007 | Kikinis | |
| 2007/0160036 A1 | 7/2007 | Smith | |
| 2007/0253429 A1 | 11/2007 | James | |
| 2007/0263610 A1 | 11/2007 | Mitchell | |
| 2007/0293205 A1 | 12/2007 | Henderson | |
| 2008/0081646 A1 | 4/2008 | Morin | |
| 2008/0186164 A1 | 8/2008 | Emigh | |
| 2009/0003535 A1 | 1/2009 | Grabelsky | |
| 2010/0003954 A1 | 1/2010 | Greene | |

FOREIGN PATENT DOCUMENTS

| | | |
|---|---|---|
| WO | WO02/011407 | 7/2001 |

OTHER PUBLICATIONS

International Search Report in PCT/US/2010/01938 dated Sep. 30, 2010.

Schulzrinne et al., Emergency Services for Internet Telephony Systems draft-schulzrinne-sipping-emergency-arch, IETF Standard Working Draft, Feb. 4, 2004, 1-22.

* cited by examiner

MOBILE AUTOMATIC LOCATION IDENTIFICATION (ALI) FOR FIRST RESPONDERS

BACKGROUND OF THE INVENTION

1. Field of the Invention

This invention relates to emergency call systems (e.g., E9-1-1), including wireless and Internet Protocol (IP) based Voice Over Internet Protocol (VoIP) emergency call systems, that rely on non-call associated signaling in order to provide location data.

2. Background of the Related Art 9-1-1 is a phone number widely recognized in North America as an emergency phone number that is used to contact emergency dispatch personnel. Enhanced 9-1-1 (E9-1-1) is defined by an emergency call being selectively routed to an appropriate PSAP, based on a special identifier (P-ANI, or "Pseudo Automatic Number Identifier", also referred to as "ESxK"), and includes the transmission of callback number and location information when 9-1-1 is used. E9-1-1 may be implemented for landline, cellular or VoIP networks. A Public Service Answering Point (PSAP) is a dispatch office that receives 9-1-1 calls from the public. A PSAP may be a local, fire or police department, an ambulance service or a regional office covering all services. As used herein, the term "PSAP" refers to either a public safety access point (PSAP), or to an Emergency Call Center (ECC), a VoIP term.

Regardless of the network type, a 9-1-1 service becomes E-9-1-1 when automatic number identification and automatic location information related to the call is provided to the 9-1-1 operator at the PSAP. A primary challenge results from the fact that calls may arrive at the PSAP without the caller's actual callback number or location information displayed at the emergency operator's terminal.

FIG. 3 shows a conventional landline public safety access point (PSAP) to automatic location identifier (ALI) connection.

In particular, FIG. 3 shows a PSAP 400 connected to one Automatic Location Identifier (ALI) database 401. Upon receiving a 9-1-1 call, the PSAP 400 queries the ALI 401 for location data. The ALI database 401 accepts the query from the PSAP 400 for location. The query includes the telephone number of an emergency caller. The ALI database 401 relates the received telephone number to a physical street address and provides that street address (location information) back to the PSAP 400 in a manner that works for the customer premise equipment (CPE) display at the PSAP 400.

An ALI is typically owned by a local exchange carrier (LEC) or a PSAP, and may be regional (i.e. connected to many PSAPs) or standalone (i.e. connected to only one PSAP). There is currently no one single standard interface protocol for PSAP-ALI connection/communication.

FIG. 4 shows a context diagram for a conventional non-landline positioning center (e.g., an Internet based voice over Internet Protocol (VoIP) positioning center).

In particular, the ALI database 401a includes a conventional emergency services key (ESQK or ESRK) in a location request sent to an appropriate positioning center 402 (XPC). The emergency services key (ESQK or ESRK) is used by the positioning center 402 as a key to look up the location and other call information associated with the emergency call.

In non-landline telephony, the PSAPs 400a query the ALI 401a for location information. However, the ALI 401a is not pre-provisioned with location data for non-landline calls (e.g. cellular, VoIP etc) and must communicate with other network entities to obtain and deliver location data to the PSAP 400.

Non-landline telephony standards (e.g. cellular, VoIP etc) have mandated that ALIs 401a maintain connectivity to a positioning center 402 that is able to provide current location data for a non-landline call. In the current state of technology, the positioning center 402 provides the caller's location and the callback number to the ALI, which passes it to the requesting PSAP. As can be seen in FIG. 4, an ALI may maintain connectivity to more than one positioning center via multiple interface types—both standard and non-standard (e.g. NENA-02, E2/E2+/V-E2(ESP), PAM, etc.).

As used herein, the generic term "XPC" refers interchangeably to any standards-based positioning center. As examples, a positioning center 402 may be any one of the following types used in non-landline networks:

GMLC (Gateway Mobile Location Center): The positioning center that retrieves, forwards, stores and controls emergency position data within the GSM location network.

MPC (Mobile Position Center): The positioning center that retrieves, forwards, stores and controls emergency position data within the ANSI location network.

VPC (VoIP Positioning Center): The positioning center which retrieves, forwards, stores and controls emergency position data within the VoIP location network.

The term "XPC network" is used herein when appropriate to refer to any non-landline network where a positioning center 402 responds to ALI queries including an emergency services key for location, e.g., cellular, VoIP etc.

In the process of handling an emergency call, a first responder (or responders) may be dispatched to the caller's location. Typically, the dispatcher at the Public Safety Answering Points (PSAPs) determines the appropriate first responder(s), and makes contact with a dispatcher for the appropriate first responder. After contact, the PSAP dispatcher (and/or the dispatcher for the first responder) conveys relevant location information to the first responder.

Using conventional techniques, most PSAPs rely on the age-old method of verbally relaying caller Automatic Location Identification (ALI) data to the first responder, i.e., speaking the caller's location information over a voice phone call between the PSAP and the first responder.

While many police and fire department vehicles do have wireless data transfer capabilities, such services are typically used to interact with local or regional databases to check license plates, criminal records, outstanding warrants, etc. No conventional method exists to use wireless data transfer capabilities for downloading ALI data relating to a PSAP's emergency call to a first responder.

While the next generation of E911 services has promised to facilitate the delivery of caller information (name, address, phone number, medical conditions, etc) from an emergency caller to the PSAP, little progress has been made in the second leg of communication, i.e., in relaying this caller information as digital data from the PSAP to the relevant first responder (e.g., police, fire, or medical).

Needless to say, while serving the purpose, verbal relay of location information is slow and prone to error. At best, verbal transfer of ALI information from a PSAP to a first responder delays a lifesaving response, and at worst can result in the dispatch of a first responder to a wrong address.

There is a long felt but unsolved need for efficient transfer of location information relating to a PSAP's emergency call from the PSAP to a first responder.

SUMMARY OF THE INVENTION

In accordance with the principles of the present invention, a method and apparatus for providing location information to a first responder comprises obtaining at a public safety answering point (PSAP), location information regarding a location of an emergency caller. The location information is presented to a web page accessible by a first responder. The first responder is permitted access to the location information via the web page. The location information is displayed on the web page showing an association with a respective emergency call.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention facilitates the transfer of Automatic Location Indication (ALI) data digitally from a Public Safety Answering Point (PSAP) to a first responder.

In particular, the inventive solution provides a web site accessible to first responders that lists each live E911 call within their jurisdiction, and appends the caller's ALI data relative to each call. Preferably the first responders (e.g., police car, paramedic, ambulance, fire truck, etc.) can view not only the emergency caller's information for those E911 calls that they are responding to, but they can also view information about other emergency callers that other first responders are responding to. This facilitates the actual response to individual emergency calls as well as the overall management of multiple responders to multiple emergency calls.

Figure 1:
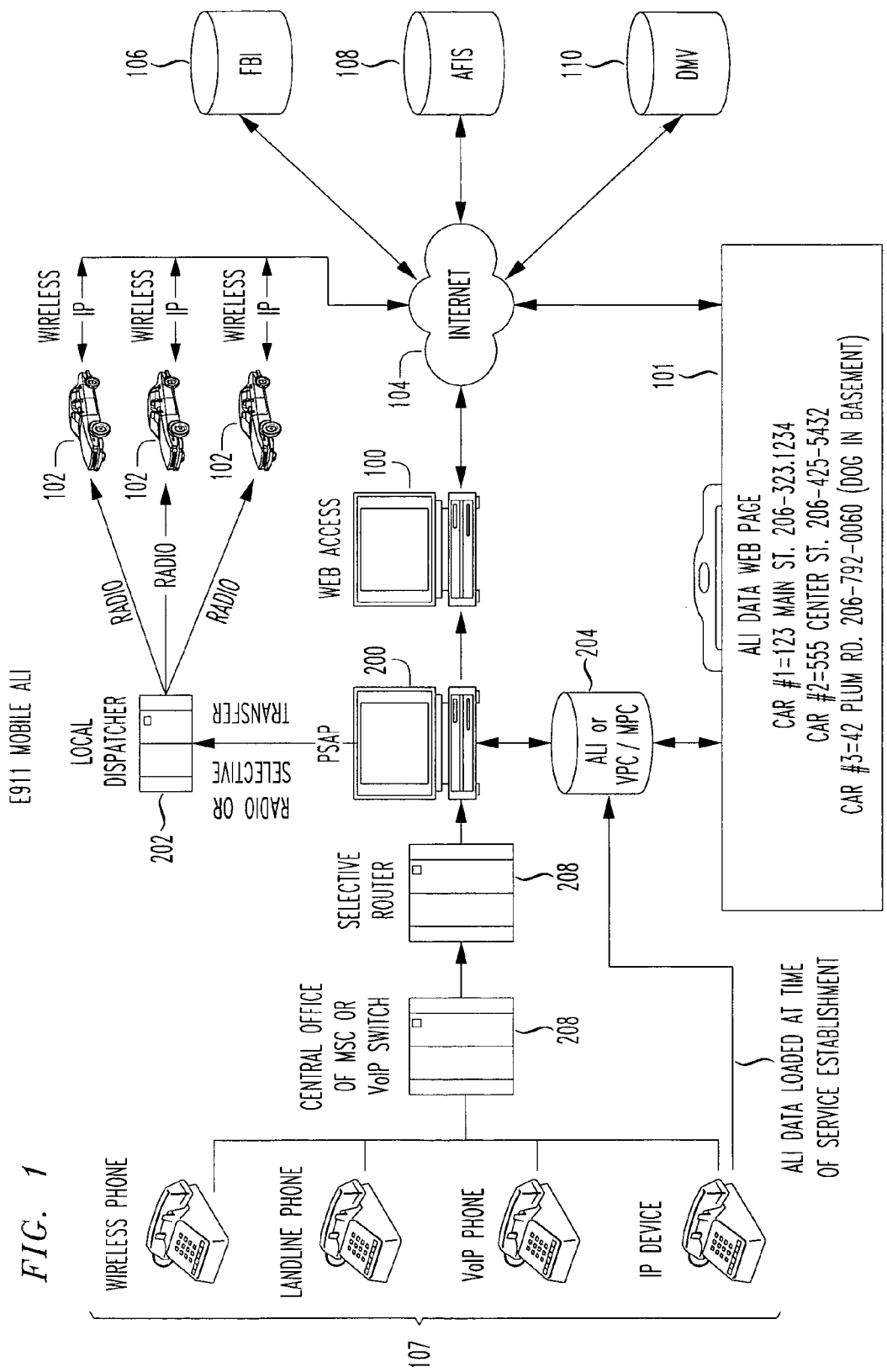
FIG. 1 shows relevant network elements in an E911 mobile ALI system that provides ALI data digitally from a PSAP to a first responder, in accordance with the principles of the present invention.

FIG. 1 shows relevant network elements in an E911 mobile ALI system that provides ALI data digitally from a PSAP to a first responder, in accordance with the principles of the present invention.

In particular, as shown in FIG. 1, an emergency call may be initiated from any type phone device 107, e.g., a wireless phone, a landline phone, a voice over Internet Protocol (VoIP) phone, an Internet Protocol (IP) device, etc.

The emergency call is handled by a relevant central office 208 (landline phone), mobile switching center (wireless phone), or VoIP switch (VoIP phone), and routed to an appropriate public safety answering point (PSAP) 200, e.g., via a selective router 206.

As is otherwise conventionally known, automatic location identification (ALI) location data is obtained for an appropriate ALI, VoIP positioning center (VPC), or mobile positioning center (MPC) 204.

The local dispatcher 202 at the PSAP 200 determines what first responder(s) are appropriate for the given emergency call, and dispatches the appropriate first responder vehicle 102.

Importantly, the first responder vehicles 102 are provided with Internet Protocol (IP) based wireless access capability via the public Internet 104, and a suitable web browser capable of accessing an ALI data web page 101. Suitable exemplary web browsers include, e.g., Internet Explorer from Microsoft Corporation, or Mozilla's Firefox™, etc.

Moreover, in accordance with the present invention, an Internet accessible ALI data web page 101 is hosted by the xPC, with individual ALI data displayed and correlated by ESxK. The PSAP 200 and/or local dispatcher 202 maintain realtime updates by adding the identity of the dispatched unit to the ALI display. Importantly, the web page is accessible by, and the first responder has access to, the Internet (e.g., via an Internet browser such as Internet Explorer™, Firefox™ or the like).

The ALI data web page 101 is capable of displaying location information relating to a current or recent emergency E911 call. ALI information displayed on the ALI data web page 101 may be maintained for a given length of time after a given emergency call terminates, based on an amount of memory available in a host server. If an indefinite amount of memory is available, ALI information displayed on the ALI data web page 101 may correspondingly be available for an indefinite length of time. In any event, the most important purpose of the ALI data web page 101 is to provide first responders to an active or very recent emergency call location information to arrive quickly to render aid to the emergency caller. Thus, even if ALI data is maintained by said ALI data web page 101 for a long length of time, it is preferable that it be subordinate to ALI data relating to current or recent emergency (e.g., E911) phone calls.

As shown in FIG. 1, government agencies such as the Federal Bureau of Investigation (FBI), the relevant Department of Motor Vehicles, the AFIS, etc. may also view the ALI location data posted at the ALI data web page 101. Equally important, the responders may view databases maintained by these agencies via the same internet connection using existing access protocols.

Figure 2:
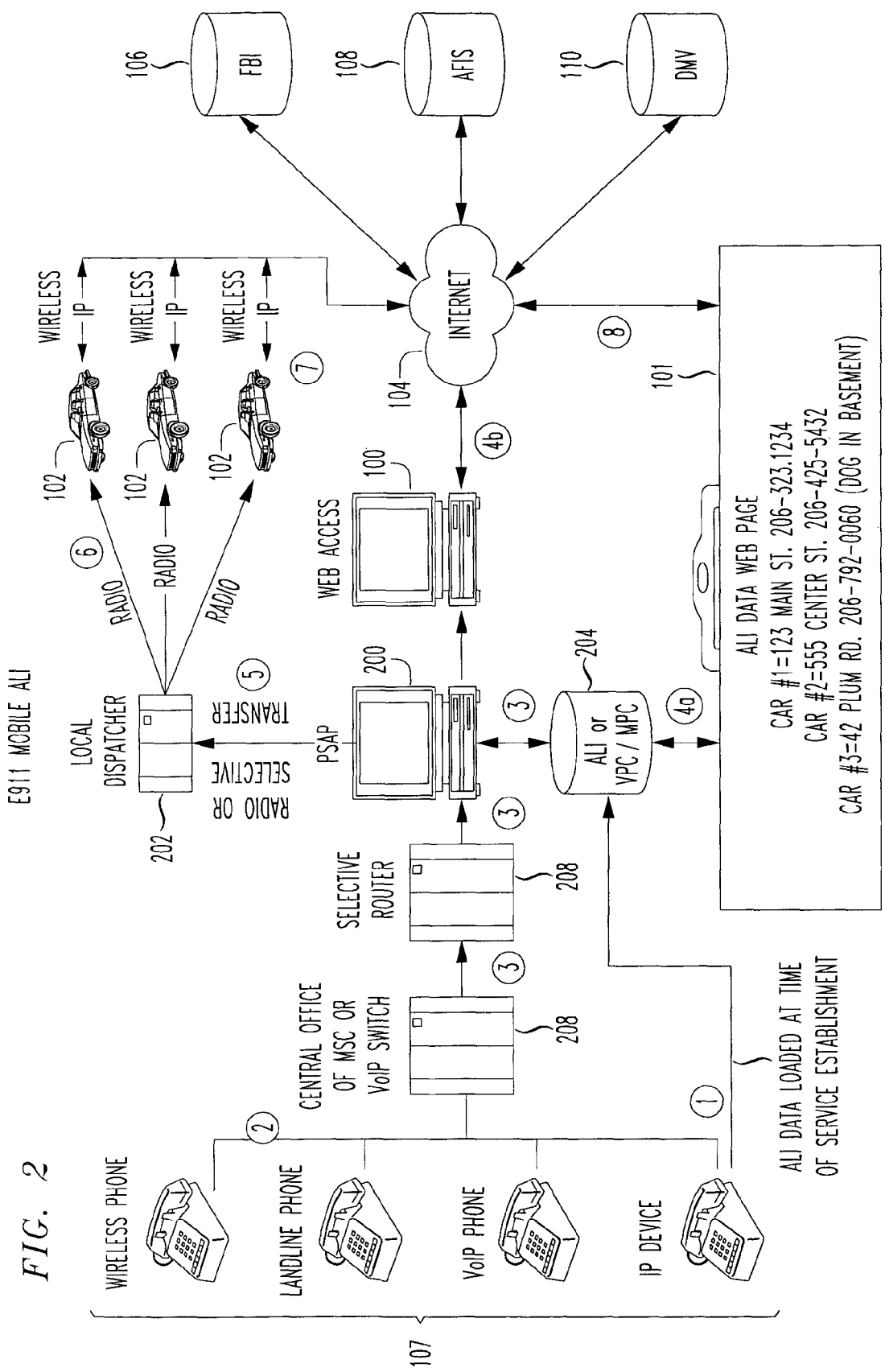
FIG. 2 shows an exemplary mobile ALI call flow tracing a 911 call using an E911 mobile ALI system such as that shown in FIG. 1.
Figure 3:
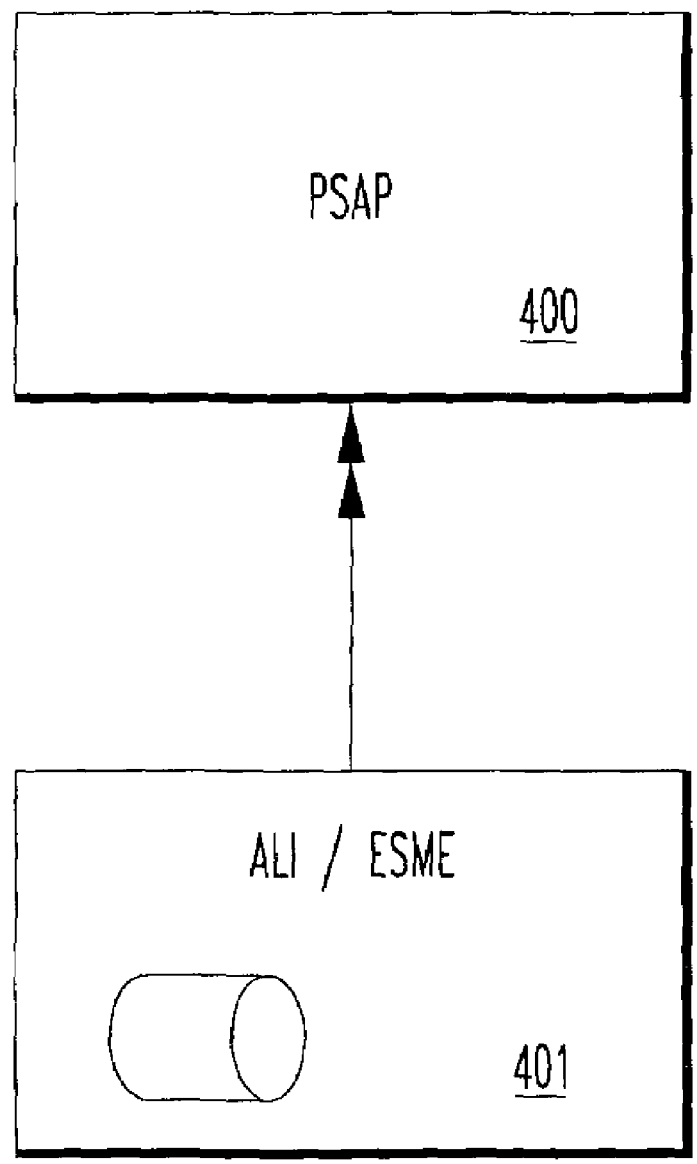
FIG. 3 shows a conventional landline public safety access point (PSAP) to automatic location identifier (ALI) connection.
Figure 4:
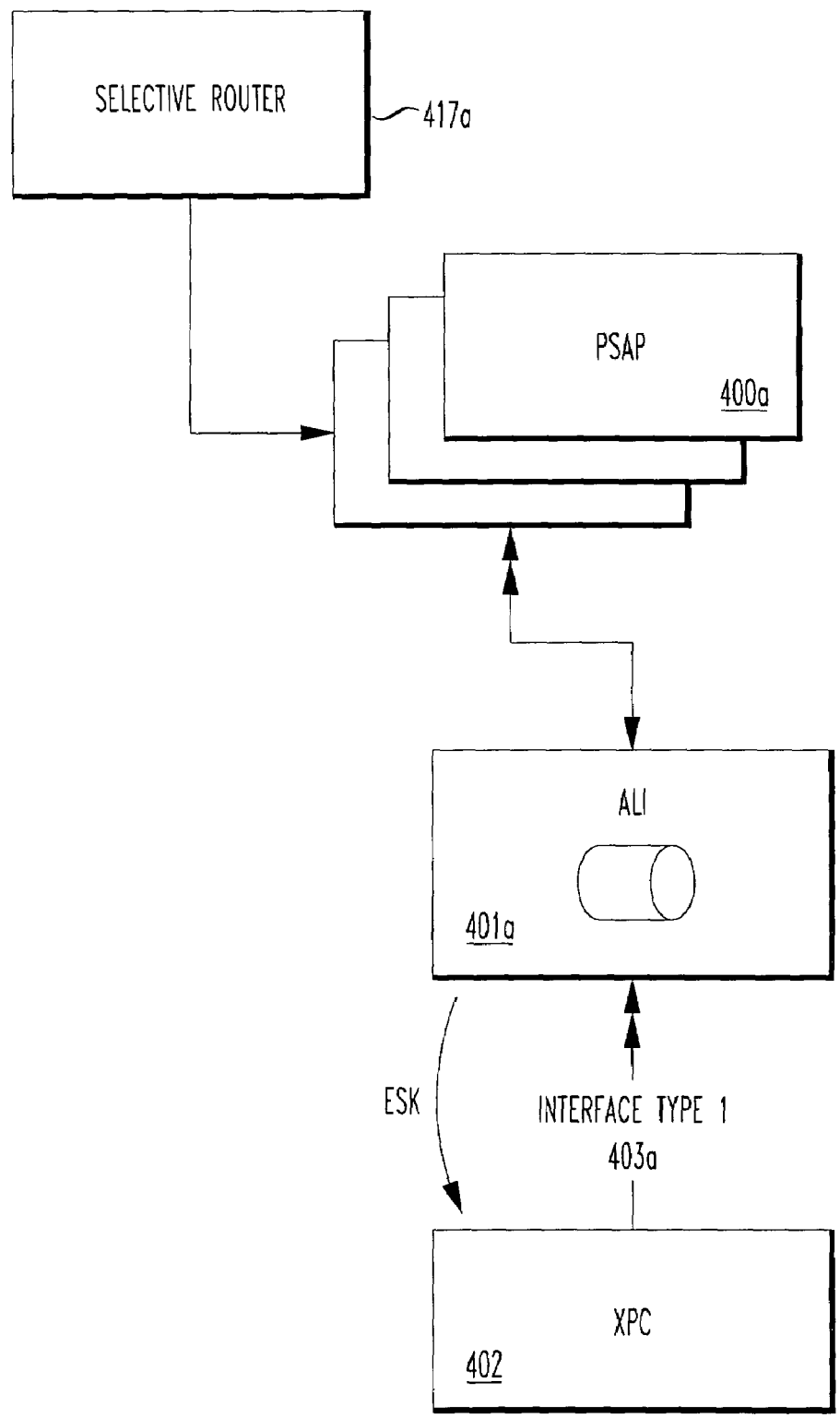
FIG. 4 shows a context diagram for a conventional non-landline positioning center (e.g., an Internet based voice over Internet Protocol (VoIP) positioning center).

FIG. 2 shows an exemplary mobile ALI call flow tracing a 911 call using an E911 mobile ALI system such as that shown in FIG. 1.

In particular, as shown in step 1 of FIG. 2, at the time of service establishment (or other appropriate time), a caller's ALI data is uploaded into an appropriate database (i.e., the ALI database). Typically, this will be an ALI database managed by the PSAP or the LEC or an MPC/VPC. Additional data can be loaded by the customer above and beyond the traditional ALI data. For example, the customer might wish to alert responders that they have pets (in case of fire), or that they are allergic to morphine, etc.

In step 2, the emergency caller dials 911 from any device, e.g., wireless, landline, voice over Internet protocol (VoIP), etc.

In step 3, the emergency call is directed to the PSAP via traditional methods. That is, the emergency call is routed to the PSAP via existing technology or via next generation Internet Protocol (IP). The PSAP queries the ALI database via existing or future IP technology, and receives ALI data via traditional methods, and retrieves ALI data.

In step 4a, the xPC stages data in a hosted web page that relates the ESxK with the ALI data for that call.

In step 4b, the PSAP dispatcher accesses the hosted ALI web site for additional ALI information data. The PSAP dispatcher also annotates the web site with responder assignment. Thus, the ALI data web page 101 is hosted by the VPC/MPC 204, and the initial ALI data and ESxK information is posted by the VPC/MPC 204 (step 4a). In the disclosed embodiments, the dispatcher merely adds the dispatched vehicle information in step 4*b*.

Thus, using the caller's telephone number, the PSAP queries a separate web site for additional ALI data. Via this web site, the PSAP dispatcher enters the responder info that identifies which responder was assigned to this call. In some cases, this responder might be a local police precinct, for example. The dispatcher at the precinct can then log into the web site and add information as to which specific patrol car was dispatched to the scene. The dispatcher at the PSAP or at the precinct can also view what other patrol cars have been dispatched to what other emergencies.

In step 5, the PSAP dispatcher relays caller information data to the local first responder, or dispatches responders directly via radio.

Thus, the local responder receives the verbal dispatch and logs onto the web site. The responder can input his/her own ID and can then view information related to calls that have been dispatched to him/her. The responders can also view what fellow responders have been dispatched to other emergencies.

In step 6, if related to an intermediate dispatcher, the intermediate dispatcher accesses the web site and updates the ultimate responder information. The responder can add additional data to the web site related to the status of the response.

In step 7, when the responder receives the radio call, they log into the web site.

In step 8, the web site displays all data related to the emergency call, plus data for all other responders.

Benefits of the invention include, aside from facilitating individual emergency responses and overall emergency management, the responders' management can use this web site to download daily summary reports.

The invention has particular use with any public safety entity involved in emergency response, particularly those related to E911.

While the invention has been described with reference to the exemplary embodiments thereof, those skilled in the art will be able to make various modifications to the described embodiments of the invention without departing from the true spirit and scope of the invention.

What is claimed is:

1. A method for providing location information to an emergency responder device, comprising:
    obtaining, at a public safety answering point (PSAP), location information associated with an emergency caller device from an automatic location identification (ALI) database;
    presenting said ALI location information with a web page accessible by an emergency responder device; and
    permitting said emergency responder device access to said ALI location information via said web page;
    wherein said ALI location information is displayed on said web page showing an association with a respective emergency call.

2. The method for providing location information to an emergency responder device according to claim 1, wherein:
    said web page displays a plurality of emergency calls, each of said plurality of emergency calls being associated with location information obtained by a respective PSAP, and each of said plurality of emergency calls being presented to said web page by said respective PSAP.

3. The method for providing location information to an emergency responder device according to claim 1, wherein:
    said web page is publicly accessible.

4. The method for providing location information to an emergency responder device according to claim 1, wherein:
    said emergency responder device is associated with a police car.

5. The method for providing location information to an emergency responder device according to claim 1, wherein:
    said emergency responder device is associated with an ambulance.

6. The method for providing location information to an emergency responder device according to claim 1, wherein:
    said emergency responder device is associated with a fire truck.

7. Apparatus for providing location information to an emergency responder device, comprising:
    means for obtaining, at a public safety answering point (PSAP), location information associated with an emergency caller device from an automatic location identification (ALI) database;
    means for presenting said ALI location information with a web page accessible by an emergency responder device; and
    means for permitting said emergency responder device access to said ALI location information via said web page;
    wherein said ALI location information is displayed on said web page showing an association with a respective emergency call.

8. The apparatus for providing location information to an emergency responder device according to claim 7, wherein:
    said web page displays a plurality of emergency calls, each of said plurality of emergency calls being associated with location information obtained by a respective PSAP, and each of said plurality of emergency calls being presented to said web page by said respective PSAP.

9. The apparatus for providing location information to an emergency responder device according to claim 7, wherein:
    said web page is adapted to be publicly accessible.

10. The apparatus providing location information to an emergency responder device according to claim 7, wherein:
    said emergency responder device is associated with a police car.

11. The apparatus for providing location information to an emergency responder device according to claim 7, wherein:
    said emergency responder device is associated with an ambulance.

12. The apparatus for providing location information to an emergency responder device according to claim 7, wherein:
    said emergency responder device is associated with a fire truck.

* * * * *